(12) United States Patent
Mignogna et al.

(10) Patent No.: US 9,416,203 B2
(45) Date of Patent: Aug. 16, 2016

(54) CATALYST COMPONENTS FOR THE POLYMERIZATION OF OLEFINS

(71) Applicant: Basell Poliolefine Italia S.r.l., Milan (IT)

(72) Inventors: Alessandro Mignogna, Ferrara (IT); Simona Guidotti, Ferrara (IT); Giampiero Morini, Ferrara (IT); Joachim T.M. Pater, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 14 days.

(21) Appl. No.: 14/402,941

(22) PCT Filed: May 17, 2013

(86) PCT No.: PCT/EP2013/060289
§ 371 (c)(1),
(2) Date: Nov. 21, 2014

(87) PCT Pub. No.: WO2013/174759
PCT Pub. Date: Nov. 28, 2013

(65) Prior Publication Data
US 2015/0158957 A1    Jun. 11, 2015

Related U.S. Application Data

(60) Provisional application No. 61/650,827, filed on May 23, 2012.

(30) Foreign Application Priority Data

May 23, 2012    (EP) .................................... 12169055

(51) Int. Cl.
*C08F 10/06* (2006.01)
*C08F 10/00* (2006.01)
(52) U.S. Cl.
CPC ................. *C08F 10/06* (2013.01); *C08F 10/00* (2013.01)
(58) Field of Classification Search
None
See application file for complete search history.

(56) References Cited

PUBLICATIONS

Database CA Chemical Abstracts Service, Columbus, Ohio, US; 2006, Zhao Siyuan et al: "Catalyst for Olefin Polymerization", XP002685891, retrieved from STN Database accession No. 2006: 130173 abstract & CN1611515A (China Petrochemical Co Ltd [CN] China Petroleum & Chemical [CN] May 4, 2005.
Database CA Chemical Abstracts Service, Columbus, Ohio, US; 2009, Zhu, Hailiang et al: "Prepration of Depside Compounds for Treatment of Inflammation", XP002685892, retrieved from STN Database Accession No. 2009:9786 abstract & CN101333166A (Univ Nanjin [CN]) Dec. 31, 2008.
LV P C et al: "Synthesis, characterization and Structure-Activity Relationship Analysis of Novel Depsides as Potential Antibacterials", European Journal of Medicinal Chemistry, Editions Scientifique Elsevier, Paris, FR, vol. 44, No. 4, a Apr. 4, 2009, pp. 1779-1787, XP026003116, ISSN: 0223-5234, DOI: 10.1016/J.Ejmech.2008.04. 019 [retrieved on May 4, 2008] Scheme 1 C1-C5,C14-C18.
LV Peng-Cheng et al: "Novel depsides as potential anti-inflammatory agents with poten inhibitory activity against *Escherichia coli*-induced interleaukin-8 Production", Journal of Enzyme Inhibition and Medicinal Chemistry, Taylor, Reading, GB, vol. 25, No. 4, Aug. 1, 2010, pp. 590-595, XP008156970, ISSN: 1475-6366, DOI: 10.3109/ 14756360903357551 Scheme 1; Compound 17.

*Primary Examiner* — Ling Choi
*Assistant Examiner* — Catherine S Branch

(57) ABSTRACT

Catalyst component for the polymerization of olefins comprising Mg, Ti and an electron donor compound of the following formula (I)

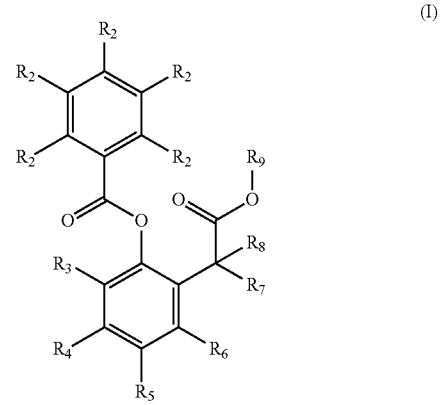

in which R2-R8 groups, equal or different to each other, are selected from hydrogen, halogen and C1-C15 hydrocarbon groups, optionally containing an heteroatom selected from halogen, O, P, S, N, and Si and R9 groups are selected from C1-C15 hydrocarbon groups optionally containing an heteroatom selected from halogen, O, P, S, N, and Si.

20 Claims, No Drawings

CATALYST COMPONENTS FOR THE POLYMERIZATION OF OLEFINS

This application is the U.S. National Phase of PCT International Application PCT/EP2013/060289, filed May 17, 2013, claiming benefit of priority to European Patent Application No. 12169055.6, filed May 23, 2012, and benefit of priority under 35 U.S.C. §119(e) of U.S. Provisional Application No. 61/650,827 filed May 23, 2012, the contents of which are incorporated herein by reference in their entirety.

FIELD OF THE INVENTION

The present invention relates to catalyst components for the polymerization of olefins, in particular propylene, comprising a Mg dihalide based support on which are supported Ti atoms and at least an electron donor selected from a specific class of compounds. The present invention further relates to the catalysts obtained from said components and to their use in processes for the polymerization of olefins in particular propylene.

BACKGROUND OF THE INVENTION

Catalyst components of the Ziegler-Natta type for the stereospecific polymerization of olefins are widely known in the art. The latest developed catalysts for propylene polymerization comprise a solid catalyst component, constituted by a magnesium dihalide on which are supported a titanium compound and an internal electron donor compound, used in combination with an Al-alkyl compound and often with an external donor which is needed in order to obtain higher isotacticity. One of the preferred classes of internal donors is constituted by the esters of phthalic acid, diisobutylphthalate being the most used. The phthalates are used as internal donors in combination with alkylalkoxysilanes as external donor. This catalyst system is capable of giving good performances in terms of activity, and propylene polymers with high isotacticity and xylene insolubility endowed with an intermediate molecular weight distribution.

Use of some phthalates however has been recently addressed as involving potential toxicity problems and therefore research activities have been devoted to find alternative classes of donor capable of replacing phthalates in terms of both performances and quality of the product. U.S. Pat. No. 7,351,778 discloses esters belonging to the formula R'—CO—O-A-CO—$OR_1$ in which R' and $R_1$ which may be identical or different, can be substituted or unsubstituted hydrocarbyl having 1 to 20 carbon atoms and A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atoms and/or hydrogen atoms on above-mentioned bivalent linking group and substituents can be replaced by a hetero-atom selected from the group consisting of nitrogen, oxygen, sulfur, silicon, phosphorus, and halogen atom, and two or more said substituents on the linking group can be linked to form saturated or unsaturated monocyclic or polycyclic ring.

Preferred structures are said to be those in which the bivalent linking group A is a $C_1$-$C_6$ saturated hydrocarbyl group optionally substituted with $C_1$-$C_4$ alkyls. However, the only tested structures are β-benzoyloxy esters in which the bivalent linking group A is made of 2 carbon atoms. The level of performances reported in the patent reference is scattered however, it can be understood that, as an average, the level of stereospecificity/activity balance is to be improved particularly in terms of activity level.

Based on this fact it has been very surprising to discover that a specific subclass of γ-benzoyloxy esters showed improved results in terms of activity/stereospecificity balance with respect to the β-benzoyloxy esters of the prior art.

SUMMARY OF THE INVENTION

Accordingly, an object of the present invention is a catalyst component for the polymerization of olefins comprising Mg, Ti and an electron donor compound of the following formula (I)

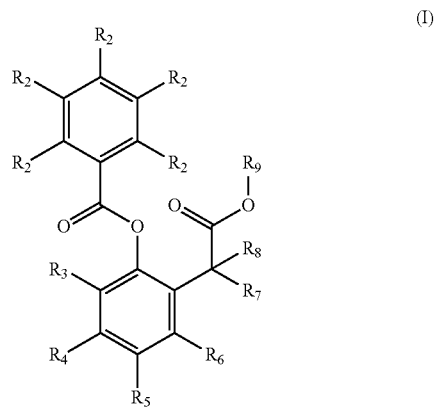

In which $R_2$-$R_8$ groups, equal or different to each other, are selected from hydrogen, halogen and $C_1$-$C_{15}$ hydrocarbon groups which can be linked together to form one or more saturated or unsaturated cycles and can optionally contain an heteroatom selected from halogen, O, P, S, N, and Si and $R_9$ groups are selected from $C_1$-$C_{15}$ hydrocarbon groups optionally containing an heteroatom selected from halogen, O, P, S, N, and Si.

DETAILED DESCRIPTION OF THE INVENTION

For all the structures described in the present application, preferred $R_9$ groups are selected from $C_1$-$C_{10}$ hydrocarbon groups, more preferably from $C_1$-$C_{10}$ alkyl groups and especially from $C_1$-$C_4$ linear alkyl groups. Ethyl is a an especially preferred $R_9$ group.

Moreover, it is also of general applicability the preferred embodiment in which at least one of $R_2$ is different from hydrogen and preferably selected from $C_1$-$C_{15}$ hydrocarbon groups or halogen. In a most preferred embodiment, only one of $R_2$ groups is different from hydrogen. Among hydrocarbon groups preferred substituents are $C_1$-$C_{10}$ alkyl groups, $C_6$-$C_{14}$ aryl groups, $C_3$-$C_{15}$ cycloalkyl groups, and $C_7$-$C_{15}$ arylalkyl or alkylaryl groups. More preferably, they can be $C_1$-$C_{10}$ alkyl groups and even more preferably linear $C_1$-$C_5$ alkyl groups. The hydrocarbon substituents are preferably located in 4-position.

Halogens are also preferred substituents as R2 groups, and among them, Cl, Br and F are the preferred halogens. Cl being the most preferred. Preferred positions are meta and/or para with respect to the carbon atom of the phenyl ring linked to the carboxylic group of formula (I). Also other positions in addition to meta and/or para could be substituted with halogens and/or hydrocarbon groups.

Preferably, in the electron donor of formula (I), at least one of the $R_3$-$R_6$ groups is different from hydrogen. More preferably, at least one of said $R_3$-$R_6$ groups is selected from $C_1$-$C_5$ alkyl groups, such as methyl, ethyl, isopropyl, isobutyl and tert-butyl, tert-amyl and 2-methyl-2-pentenyl. In a particularly preferred embodiment at least two of $R_3$-$R_6$ groups are selected from $C_1$-$C_5$ alkyl groups, such as methyl, ethyl, isopropyl, isobutyl and tert-butyl. Preferably, $R_3$ and $R_5$ groups are different from hydrogen and selected from $C_1$-$C_5$ alkyl groups. Still more preferably, $R_3$ is a linear $C_1$-$C_5$ alkyl group, such as methyl, and $R_5$ is a branched alkyl group such as tert-butyl.

$R_7$ and $R_8$ are preferably and independently selected from hydrogen, and $C_1$-$C_{15}$ hydrocarbon groups. Preferably they are selected from hydrogen and $C_1$-$C_{10}$ hydrocarbon groups and more preferably from hydrogen and $C_1$-$C_8$ linear or branched alkyl groups. Among them particularly preferred are methyl, ethyl, propyl, isopropyl, n-butyl, i-butyl, sec-butyl, t-butyl.

Preferably, only one of $R_7$ and $R_8$ is different form hydrogen.

Non limiting examples of structures according formulae I are the following:
4-(tert-butyl)-2-(1-ethoxy-1-oxo-3-phenylpropan-2-yl)-6-methylphenyl 3-chlorobenzoate, 4-(tert-butyl)-2-(1-ethoxy-1-oxo-3-phenylpropan-2-yl)-6-methylphenyl 4-butylbenzoate, 4-(tert-butyl)-2-(1-ethoxy-1-oxo-3-phenylpropan-2-yl)-6-methylphenyl 4-ethylbenzoate, 4-(tert-butyl)-2-(1-ethoxy-1-oxo-3-phenylpropan-2-yl)-6-methylphenyl 4-methylbenzoate, 4-(tert-butyl)-2-(1-ethoxy-1-oxo-3-phenylpropan-2-yl)-6-methylphenyl 4-propylbenzoate, 4-(tert-butyl)-2-(1-ethoxy-1-oxo-3-phenylpropan-2-yl)-6-methylphenyl benzoate, 4-(tert-butyl)-2-(1-ethoxy-1-oxohexan-2-yl)-6-methylphenyl 3-chlorobenzoate, 4-(tert-butyl)-2-(1-ethoxy-1-oxohexan-2-yl)-6-methylphenyl 4-butylbenzoate, 4-(tert-butyl)-2-(1-ethoxy-1-oxohexan-2-yl)-6-methylphenyl 4-ethylbenzoate, 4-(tert-butyl)-2-(1-ethoxy-1-oxohexan-2-yl)-6-methylphenyl 4-methylbenzoate, 4-(tert-butyl)-2-(1-ethoxy-1-oxohexan-2-yl)-6-methylphenyl 4-propylbenzoate, 4-(tert-butyl)-2-(1-ethoxy-1-oxohexan-2-yl)-6-methylphenyl benzoate, 4-(tert-butyl)-2-(1-ethoxy-1-oxopropan-2-yl)-6-methylphenyl 3-chlorobenzoate, 4-(tert-butyl)-2-(1-ethoxy-1-oxopropan-2-yl)-6-methylphenyl 4-butylbenzoate, 4-(tert-butyl)-2-(1-ethoxy-1-oxopropan-2-yl)-6-methylphenyl 4-ethylbenzoate, 4-(tert-butyl)-2-(1-ethoxy-1-oxopropan-2-yl)-6-methylphenyl 4-methylbenzoate, 4-(tert-butyl)-2-(1-ethoxy-1-oxopropan-2-yl)-6-methylphenyl 4-propylbenzoate, 4-(tert-butyl)-2-(1-ethoxy-1-oxopropan-2-yl)-6-methylphenyl benzoate, 4-(tert-butyl)-2-(1-ethoxy-3,3-dimethyl-1-oxobutan-2-yl)-6-methylphenyl 3-chlorobenzoate, 4-(tert-butyl)-2-(1-ethoxy-3,3-dimethyl-1-oxobutan-2-yl)-6-methylphenyl 4-butylbenzoate, 4-(tert-butyl)-2-(1-ethoxy-3,3-dimethyl-1-oxobutan-2-yl)-6-methylphenyl 4-ethylbenzoate, 4-(tert-butyl)-2-(1-ethoxy-3,3-dimethyl-1-oxobutan-2-yl)-6-methylphenyl 4-methylbenzoate, 4-(tert-butyl)-2-(1-ethoxy-3,3-dimethyl-1-oxobutan-2-yl)-6-methylphenyl 4-propylbenzoate, 4-(tert-butyl)-2-(1-ethoxy-3,3-dimethyl-1-oxobutan-2-yl)-6-methylphenyl benzoate, 4-(tert-butyl)-2-(1-ethoxy-3-methyl-1-oxobutan-2-yl)-6-methylphenyl 3-chlorobenzoate, 4-(tert-butyl)-2-(1-ethoxy-3-methyl-1-oxobutan-2-yl)-6-methylphenyl 4-butylbenzoate, 4-(tert-butyl)-2-(1-ethoxy-3-methyl-1-oxobutan-2-yl)-6-methylphenyl 4-ethylbenzoate, 4-(tert-butyl)-2-(1-ethoxy-3-methyl-1-oxobutan-2-yl)-6-methylphenyl 4-methylbenzoate, 4-(tert-butyl)-2-(1-ethoxy-3-methyl-1-oxobutan-2-yl)-6-methylphenyl 4-propylbenzoate, 4-(tert-butyl)-2-(1-ethoxy-3-methyl-1-oxobutan-2-yl)-6-methylphenyl benzoate, 4-(tert-butyl)-2-(1-ethoxy-4-methyl-1-oxopentan-2-yl)-6-methylphenyl 3-chlorobenzoate, 4-(tert-butyl)-2-(1-ethoxy-4-methyl-1-oxopentan-2-yl)-6-methylphenyl 4-butylbenzoate, 4-(tert-butyl)-2-(1-ethoxy-4-methyl-1-oxopentan-2-yl)-6-methylphenyl 4-ethylbenzoate, 4-(tert-butyl)-2-(1-ethoxy-4-methyl-1-oxopentan-2-yl)-6-methylphenyl 4-methylbenzoate, 4-(tert-butyl)-2-(1-ethoxy-4-methyl-1-oxopentan-2-yl)-6-methylphenyl 4-propylbenzoate, 4-(tert-butyl)-2-(1-ethoxy-4-methyl-1-oxopentan-2-yl)-6-methylphenyl benzoate, 4-(tert-butyl)-2-(2-ethoxy-2-oxo-1-phenylethyl)-6-methylphenyl 3-chlorobenzoate, 4-(tert-butyl)-2-(2-ethoxy-2-oxo-1-phenylethyl)-6-methylphenyl 4-butylbenzoate, 4-(tert-butyl)-2-(2-ethoxy-2-oxo-1-phenylethyl)-6-methylphenyl 4-ethylbenzoate, 4-(tert-butyl)-2-(2-ethoxy-2-oxo-1-phenylethyl)-6-methylphenyl 4-methylbenzoate, 4-(tert-butyl)-2-(2-ethoxy-2-oxo-1-phenylethyl)-6-methylphenyl 4-propylbenzoate, 4-(tert-butyl)-2-(2-ethoxy-2-oxo-1-phenylethyl)-6-methylphenyl benzoate, 4-(tert-butyl)-2-(2-ethoxy-2-oxoethyl)-6-methylphenyl 3-chlorobenzoate, 4-(tert-butyl)-2-(2-ethoxy-2-oxoethyl)-6-methylphenyl 4-butylbenzoate, 4-(tert-butyl)-2-(2-ethoxy-2-oxoethyl)-6-methylphenyl 4-ethylbenzoate, 4-(tert-butyl)-2-(2-ethoxy-2-oxoethyl)-6-methylphenyl 4-methylbenzoate, 4-(tert-butyl) 2-(2-ethoxy-2-oxoethyl)-6-methylphenyl 4-propylbenzoate, 4-(tert-butyl)-2-(2-ethoxy-2-oxoethyl)-6-methylphenyl benzoate, 2-(2-butoxy-2-oxoethyl)-4-(tert-butyl)-6-methylphenyl 4-propylbenzoate, 4-(tert-butyl)-2-(2-ethoxy-2-oxoethyl)-6-methylphenyl 4-propylbenzoate, 4-(tert-butyl)-2-(2-isobutoxy-2-oxoethyl)-6-methylphenyl 4-propylbenzoate, 2-(1-ethoxy-1-oxohexan-2-yl)-4,6-diisopropylphenyl 3-chlorobenzoate, 2-(1-ethoxy-1-oxohexan-2-yl)-4,6-diisopropylphenyl 4-butylbenzoate, 2-(1-ethoxy-1-oxohexan-2-yl)-4,6-diisopropylphenyl 4-propylbenzoate, 2-(1-ethoxy-1-oxohexan-2-yl)-4,6-diisopropylphenyl benzoate, 2-(1-ethoxy-3-methyl-1-oxobutan-2-yl)-4,6-diisopropylphenyl 3-chlorobenzoate, 2-(1-ethoxy-3-methyl-1-oxobutan-2-yl)-4,6-diisopropylphenyl 4-butylbenzoate, 2-(1-ethoxy-3-methyl-1-oxobutan-2-yl)-4,6-diisopropylphenyl 4-propylbenzoate, 2-(1-ethoxy-3-methyl-1-oxobutan-2-yl)-4,6-diisopropylphenyl benzoate, 2-(1-ethoxy-4-methyl-1-oxopentan-2-yl)-4,6-diisopropylphenyl 3-chlorobenzoate, 2-(1-ethoxy-4-methyl-1-oxopentan-2-yl)-4,6-diisopropylphenyl 4-butylbenzoate, 2-(1-ethoxy-4-methyl-1-oxopentan-2-yl)-4,6-diisopropylphenyl 4-propylbenzoate, 2-(1-ethoxy-4-methyl-1-oxopentan-2-yl)-4,6-diisopropylphenyl benzoate, 2-(2-ethoxy-2-oxoethyl)-4,6-diisopropylphenyl 3-chlorobenzoate, 2-(2-ethoxy-2-oxoethyl)-4,6-diisopropylphenyl 4-butylbenzoate, 2-(2-ethoxy-2-oxoethyl)-4,6-diisopropylphenyl 4-propylbenzoate, 2-(2-ethoxy-2-oxoethyl)-4,6-diisopropylphenyl benzoate, 2-(1-ethoxy-1-oxohexan-2-yl)-4,6-dimethylphenyl 3-chlorobenzoate, 2-(1-ethoxy-1-oxohexan-2-yl)-4,6-dimethylphenyl 4-butylbenzoate, 2-(1-ethoxy-1-oxohexan-2-yl)-4,6-dimethylphenyl 4-propylbenzoate, 2-(1-ethoxy-1-oxohexan-2-yl)-4,6-dimethylphenyl benzoate, 2-(1-ethoxy-3-methyl-1-oxobutan-2-yl)-4,6-dimethylphenyl 3-chlorobenzoate, 2-(1-ethoxy-3-methyl-1-oxobutan-2-yl)-4,6-dimethylphenyl 4-butylbenzoate, 2-(1-ethoxy-3-methyl-1-oxobutan-2-yl)-4,6-dimethylphenyl 4-propylbenzoate, 2-(1-ethoxy-3-methyl-1-oxobutan-2-yl)-4,6-dimethylphenyl benzoate, 2-(1-ethoxy-4-methyl-1-oxopentan-2-yl)-4,6-dimethylphenyl 3-chlorobenzoate, 2-(1-ethoxy-4-methyl-1-oxopentan-2-yl)-4,6-dimethylphenyl 4-butylbenzoate, 2-(1-ethoxy-4-methyl-1-oxopentan-2-yl)-4,6-dimethylphenyl 4-propylbenzoate, 2-(1-ethoxy-4-methyl-1-oxopentan-2-yl)-4,6-dimethylphenyl benzoate, 2-(2-ethoxy-2-oxoethyl)-4,6-dimethylphenyl 3-chlorobenzoate, 2-(2-ethoxy-2-oxoethyl)-4,6-dimethylphenyl 4-butylbenzoate, 2-(2-ethoxy-2-oxoethyl)-4,6-dimethylphenyl 4-propylbenzoate, 2-(2-ethoxy-2-oxoethyl)-4,6-dimethylphenyl benzoate, 2-(1-ethoxy-1-oxohexan-2-yl)phenyl 3-chlorobenzoate, 2-(1-ethoxy-1-oxohexan-2-yl)phenyl 4-butylbenzoate, 2-(1-ethoxy-1-oxohexan-2-yl)phenyl 4-propylbenzoate, 2-(1-ethoxy-1-oxohexan-2-yl)phenyl benzoate, 2-(1-ethoxy-3-methyl-1-oxobutan-2-yl)phenyl 3-chlorobenzoate, 2-(1-ethoxy-3-methyl-1-oxobutan-2-yl)phenyl 4-butylbenzoate, 2-(1-ethoxy-3-methyl-1-oxobutan-2-yl)phenyl 4-propylbenzoate, 2-(1-ethoxy-3-methyl-1-oxobutan-2-yl)phenyl benzoate, 2-(1-ethoxy-4-methyl-1-oxopentan-2-yl)phenyl 3-chlorobenzoate, 2-(1-ethoxy-4-methyl-1-oxopentan-2-yl)phenyl 4-butylbenzoate, 2-(1-ethoxy-4-methyl-1-oxopentan-2-yl)phenyl 4-propylbenzoate, 2-(1-ethoxy-4-methyl-1-oxopentan-2-yl)phenyl benzoate, 2-(2-ethoxy-2-oxoethyl)phenyl 3-chlorobenzoate, 2-(2-ethoxy-2-oxoethyl)phenyl 4-butylbenzoate, 2-(2-ethoxy-2-oxoethyl)phenyl 4-propylbenzoate, 2-(2-ethoxy-2-oxoethyl)phenyl benzoate, 2,4-di-tert-butyl-6-(1-ethoxy-1-oxohexan-2-yl)phenyl 3-chlorobenzoate, 2,4-di-tert-butyl-6-(1-ethoxy-1-oxohexan-2-yl)phenyl 4-butylbenzoate, 2,4-di-tert-butyl-6-(1-ethoxy-1-oxohexan-2-yl)phenyl 4-propylbenzoate, 2,4-di-tert-butyl-6-(1-ethoxy-1-oxohexan-2-yl)phenyl benzoate, 2,4-di-tert-butyl-6-(1-ethoxy-3-methyl-1-oxobutan-2-yl)phenyl 3-chlorobenzoate, 2,4-di-tert-butyl-6-(1-ethoxy-3-methyl-1-oxobutan-2-yl)phenyl 4-butylbenzoate, 2,4-di-tert-butyl-6-(1-ethoxy-3-methyl-1-oxobutan-2-yl)phenyl 4-propylbenzoate, 2,4-di-tert-butyl-6-(1-ethoxy-3-methyl-1-oxobutan-2-yl)phenyl benzoate, 2,4-di-tert-butyl-6-(1-ethoxy-4-methyl-1-oxopentan-2-yl)phenyl 3-chlorobenzoate, 2,4-di-tert-butyl-6-(1-ethoxy-4-methyl-1-oxopentan-2-yl)phenyl 4-butylbenzoate, 2,4-di-tert-butyl-6-(1-ethoxy-4-methyl-1-oxopentan-2-yl)phenyl 4-propylbenzoate, 2,4-di-tert-butyl-6-(1-ethoxy-4-methyl-1-oxopentan-2-yl)phenyl benzoate, 2,4-di-tert-butyl-6-(2-ethoxy-2-oxoethyl)phenyl 3-chlorobenzoate, 2,4-di-tert-butyl-6-(2-ethoxy-2-oxoethyl)phenyl 4-butylbenzoate, 2,4-di-tert-butyl-6-(2-ethoxy-2-oxoethyl)phenyl 4-propylbenzoate, 2,4-di-tert-butyl-6-(2-ethoxy-2-oxoethyl)phenyl benzoate, 2-(1-ethoxy-1-oxohexan-2-yl)-6-methyl-4-(tert-pentyl)phenyl 3-chlorobenzoate, 2-(1-ethoxy-1-oxohexan-2-yl)-6-methyl-4-(tert-pentyl)phenyl 4-butylbenzoate, 2-(1-ethoxy-1-oxohexan-2-yl)-6-methyl-4-(tert-pentyl)phenyl 4-propylbenzoate, 2-(1-ethoxy-1-oxohexan-2-yl)-6-methyl-4-(tert-pentyl)phenyl benzoate, 2-(1-ethoxy-3-methyl-1-oxobutan-2-yl)-6-methyl-4-(tert-pentyl)phenyl 3-chlorobenzoate, 2-(1-ethoxy-3-methyl-1-oxobutan-2-yl)-6-methyl-4-(tert-pentyl)phenyl 4-butylbenzoate, 2-(1-ethoxy-3-methyl-1-oxobutan-2-yl)-6-methyl-4-(tert-pentyl)phenyl 4-propylbenzoate, 2-(1-ethoxy-3-methyl-1-oxobutan-2-yl)-6-methyl-4-(tert-pentyl)phenyl benzoate, 2-(1-ethoxy-4-methyl-1-oxopentan-2-yl)-6-methyl-4-(tert-pentyl)phenyl 3-chlorobenzoate, 2-(1-ethoxy-4-methyl-1-oxopentan-2-yl)-6-methyl-4-(tert-pentyl)phenyl 4-butylbenzoate, 2-(1-ethoxy-4-methyl-1-oxopentan-2-yl)-6-methyl-4-(tert-pentyl)phenyl 4-propylbenzoate, 2-(1-ethoxy-4-methyl-1-oxopentan-2-yl)-6-methyl-4-(tert-pentyl)phenyl benzoate, 2-(2-ethoxy-2-oxoethyl)-6-methyl-4-(tert-pentyl)phenyl 3-chlorobenzoate, 2-(2-ethoxy-2-oxoethyl)-6-methyl-4-(tert-pentyl)phenyl 4-butylbenzoate, 2-(2-ethoxy-2-oxoethyl)-6-methyl-4-(tert-pentyl)phenyl 4-propylbenzoate, 2-(2-ethoxy-2-oxoethyl)-6-methyl-4-(tert-pentyl)phenyl benzoate, 2-(1-ethoxy-1-oxohexan-2-yl)-6-methyl-4-(2-methylpentan-2-yl)phenyl 3-chlorobenzoate, 2-(1-ethoxy-1-oxohexan-2-yl)-6-methyl-4-(2-methylpentan-2-yl)phenyl 4-butylbenzoate, 2-(1-ethoxy-1-oxohexan-2-yl)-6-methyl-4-(2-methylpentan-2-yl)phenyl 4-propylbenzoate, 2-(1-ethoxy-1-oxohexan-2-yl)-6-methyl-4-(2-methylpentan-2-yl)phenyl benzoate, 2-(1-ethoxy-3-methyl-1-oxobutan-2-yl)-6-methyl-4-(2-methylpentan-2-yl)phenyl 3-chlorobenzoate, 2-(1-ethoxy-3-methyl-1-oxobutan-2-yl)-6-methyl-4-(2-methylpentan-2-yl)phenyl 4-butylbenzoate, 2-(1-ethoxy-3-methyl-1-oxobutan-2-yl)-6-methyl-4-(2-methylpentan-2-yl)phenyl 4-propylbenzoate, 2-(1-ethoxy-3-methyl-1-oxobutan-2-yl)-6-methyl-4-(2-methylpentan-2-yl)phenyl benzoate, 2-(1-ethoxy-4-methyl-1-oxopentan-2-yl)-6-methyl-4-(2-methylpentan-2-yl)phenyl 3-chlorobenzoate, 2-(1-ethoxy-4-methyl-1-oxopentan-2-yl)-6-methyl-4-(2-methylpentan-2-yl)phenyl 4-butylbenzoate, 2-(1-ethoxy-4-methyl-1-oxopentan-2-yl)-6-methyl-4-(2-methylpentan-2-yl)phenyl 4-propylbenzoate, 2-(1-ethoxy-4-methyl-1-oxopentan-2-yl)-6-methyl-4-(2-methylpentan-2-yl)phenyl benzoate, 2-(2-ethoxy-2-oxoethyl)-6-methyl-4-(2-methylpentan-2-yl)phenyl 3-chlorobenzoate, 2-(2-ethoxy-2-oxoethyl)-6-methyl-4-(2-methylpentan-2-yl)phenyl 4-butylbenzoate, 2-(2-ethoxy-2-oxoethyl)-6-methyl-4-(2-methylpentan-2-yl)phenyl 4-propylbenzoate, 2-(2-ethoxy-2-oxoethyl)-6-methyl-4-(2-methylpentan-2-yl)phenyl benzoate, ethyl 7-((3-chlorobenzoyl)oxy)-2,3-dihydro-1H-indene-1-carboxylate, ethyl 7-((4-butylbenzoyl)oxy)-2,3-dihydro-1H-indene-1-carboxylate, ethyl 7-((4-propylbenzoyl)oxy)-2,3-dihydro-1H-indene-1-carboxylate, ethyl 7-(benzoyloxy)-2,3-dihydro-1H-indene-1-carboxylate, ethyl 8-((3-chlorobenzoyl)oxy)-1,2,3,4-tetrahydronaphthalene-1-carboxylate, ethyl 8-((3-chlorobenzoyl)oxy)-1-naphthoate, ethyl 8-((4-butylbenzoyl)oxy)-1,2,3,4-tetrahydronaphthalene-1-carboxylate, ethyl 8-((4-butylbenzoyl)oxy)-1-naphthoate, ethyl 8-((4-propylbenzoyl)oxy)-1,2,3,4-tetrahydronaphthalene-1-carboxylate, ethyl 8-((4-propylbenzoyl)oxy)-1-naphthoate, ethyl 8-(benzoyloxy)-1,2,3,4-tetrahydronaphthalene-1-carboxylate, ethyl 8-(benzoyloxy)-1-naphthoate, 2-(2-ethoxy-2-oxoethyl)-5,6,7,8-tetrahydronaphthalen-1-yl 3-chlorobenzoate, 2-(2-ethoxy-2-oxoethyl)-5,6,7,8-tetrahydronaphthalen-1-yl 4-butylbenzoate, 2-(2-ethoxy-2-oxoethyl)-5,6,7,8-tetrahydronaphthalen-1-yl 4-propylbenzoate, 2-(2-ethoxy-2-oxoethyl)-5,6,7,8-tetrahydronaphthalen-1-yl benzoate, 2-(2-ethoxy-2-oxoethyl)naphthalen-1-yl 3-chlorobenzoate, 2-(2-ethoxy-2-oxoethyl)naphthalen-1-yl 4-butylbenzoate, 2-(2-ethoxy-2-oxoethyl)naphthalen-1-yl 4-propylbenzoate, 2-(2-ethoxy-2-oxoethyl)naphthalen-1-yl benzoate, 5-(2-ethoxy-2-oxoethyl)-2,3-dihydro-1H-inden-4-yl 3-chlorobenzoate, 5-(2-ethoxy-2-oxoethyl)-2,3-dihydro-1H-inden-4-yl 4-butylbenzoate, 5-(2-ethoxy-2-oxoethyl)-2,3-dihydro-1H-inden-4-yl 4-propylbenzoate, 5-(2-ethoxy-2-oxoethyl)-2,3-dihydro-1H-inden-4-yl benzoate, 3-(2-ethoxy-2-oxoethyl)-5,6,7,8-tetrahydronaphthalen-2-yl 3-chlorobenzoate, 3-(2-ethoxy-2-oxoethyl)-5,6,7,8-tetrahydronaphthalen-2-yl 4-butylbenzoate, 3-(2-ethoxy-2-oxoethyl)-5,6,7,8-tetrahydronaphthalen-2-yl 4-propylbenzoate, 3-(2-ethoxy-2-oxoethyl)-5,6,7,8-tetrahydronaphthalen-2-yl benzoate, 3-(2-ethoxy-2-oxoethyl)naphthalen-2-yl 3-chlorobenzoate, 3-(2-ethoxy-2-oxoethyl)naphthalen-2-yl 4-butylbenzoate, 3-(2-ethoxy-2-oxoethyl)naphthalen-2-yl 4-propylbenzoate, 3-(2-ethoxy-2-oxoethyl)naphthalen-2-yl benzoate, 6-(2-ethoxy-2-oxoethyl)-2,3-dihydro-1H-inden-5-yl 3-chlorobenzoate, 6-(2-ethoxy-2-oxoethyl)-2,3-dihydro-1H-inden-5-yl 4-butylbenzoate, 6-(2-ethoxy-2-oxoethyl)-2,3-dihydro-1H-inden-5-yl 4-propylbenzoate, 6-(2-ethoxy-2-oxoethyl)-2,3-dihydro-1H-inden-5-yl benzoate, 1-(2-ethoxy-2-oxoethyl)-5,6,7,8-tetrahydronaphthalen-2-yl 3-chlorobenzoate, 1-(2-ethoxy-2-oxoethyl)-5,6,7,8-tetrahydronaphthalen-2-yl 4-butylbenzoate, 1-(2-ethoxy-2-oxoethyl)-5,6,7,8-tetrahydronaphthalen-2-yl 4-propylbenzoate, 1-(2-ethoxy-2-oxoethyl)-5,6,7,8-tetrahydronaphthalen-2-yl benzoate, 1-(2-ethoxy-2-oxoethyl)naphthalen-2-yl 3-chlorobenzoate, 1-(2-ethoxy-2-oxoethyl)naphthalen-2-yl 4-butylbenzoate, 1-(2-ethoxy-2-oxoethyl)naphthalen-2-yl 4-propylbenzoate, 1-(2-ethoxy-2-oxoethyl)naphthalen-2-yl benzoate, 4-(2-ethoxy-2-oxoethyl)-2,3-dihydro-1H-inden-5-yl 3-chlorobenzoate, 4-(2-ethoxy-2-oxoethyl)-2,3-dihydro-1H-inden-5-yl 4-butylbenzoate, 4-(2-ethoxy-2-oxoethyl)-2,3-dihydro-1H-inden-5-yl 4-propylbenzoate, 4-(2-ethoxy-2-oxoethyl)-2,3-dihydro-1H-inden-5-yl benzoate, 4-(tert-butyl)-2-(1-ethoxy-2-methyl-1-oxopropan-2-yl)-6-methylphenyl 4-propylbenzoate As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line. The preferred titanium compounds used in the catalyst component of the present invention are $TiCl_4$ and $TiCl_3$; furthermore, also Ti-haloalcoholates of formula $Ti(OR)_{q-y}X_y$ can be used, where q is the valence of titanium, y is a number between 1 and q-1, X is halogen and R is a hydrocarbon radical having from 1 to 10 carbon atoms.

The preparation of the solid catalyst component can be carried out according to several methods.

According to one of these methods, the magnesium dichloride in an anhydrous state, the titanium compound and the electron donor compounds are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compounds are treated with halogenated hydrocarbons such as 1,2-dichloroethane, chlorobenzene, dichloromethane etc.

The treatment is carried out for a time between 1 and 4 hours and at temperature of from 40° C. to the boiling point of the halogenated hydrocarbon. Another method comprises the reaction between magnesium alcoholates or chloroalcoholates (in particular chloroalcoholates prepared according to U.S. Pat. No. 4,220,554) and an excess of $TiCl_4$ in the presence of the electron donor compounds at a temperature of about 80 to 120° C.

According to a preferred method, the solid catalyst component can be prepared by reacting a titanium compound of formula $Ti(OR)_{q-y}X_y$, where q is the valence of titanium and y is a number between 1 and q, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with Ti compound or it can be previously subjected to controlled thermal dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compounds can be added in the desired ratios during the treatment with $TiCl_4$. The preparation of catalyst components in spherical form are described for example in European Patent Applications EP-A-395083, EP-A-553805, EP-A-553806, EPA601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The solid catalyst component has an average particle size ranging from 5 to 120 µm and more preferably from 10 to 100 µm.

As mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification etc.

Regardless of the preparation method used, the final amount of the electron donor compound of formula (I) is such that its molar ratio with respect to the $TiCl_4$ is from 0.01 to 2, preferably from 0.05 to 1.5 and more preferably from 0.1 to 1.

The solid catalyst components according to the present invention are converted into catalysts for the polymerization of olefins by reacting them with organoaluminum compounds according to known methods.

In particular, an object of the present invention is a catalyst for the polymerization of olefins $CH_2=CHR$, in which R is hydrogen or a hydrocarbyl radical with 1-12 carbon atoms, comprising the product obtained by contacting:

(i) the solid catalyst component as disclosed above and
(ii) an alkylaluminum compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminum compounds.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. Particularly preferred are the silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), (2-ethylpiperidinyl)t-butyldimethoxysilane, (2-ethylpiperidinyl) thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, the silicon compounds in which a is 0, c is 3, $R_7$ is a branched alkyl or cycloalkyl group, optionally containing heteroatoms, and $R_8$ is methyl are also preferred. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2=CHR$, in which R is hydrogen or a hydrocarbyl radical with 1-12 carbon atoms, carried out in the presence of a catalyst comprising the product of the reaction between:

(i) the solid catalyst component of the invention;

(ii) an alkylaluminum compound and, (iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa. The following examples are given in order to better illustrate the invention without limiting it.

EXAMPLES

Characterizations

Determination of Ti

The determination of Ti content in the solid catalyst component has been carried out via inductively coupled plasma emission spectroscopy on "I.C.P Spectrometer ARL Accuris".

The sample was prepared by analytically weighting, in a "fluxy" platinum crucible", 0.1÷0.3 grams of catalyst and 3 grams of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then the titanium was analyzed via ICP at a wavelength of 368.52 nm.

Determination of Internal Donor Content

The determination of the content of internal donor in the solid catalytic compound was done through gas chromatography. The solid component was dissolved in water. The solution was extracted with ethyl acetate, an internal standard was added, and a sample of the organic phase was analyzed in a gas chromatograph, to determine the amount of donor present at the starting catalyst compound.

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Melt Flow Rate (MFR)

The melt flow rate MIL of the polymer was determined according to ISO 1133 (230° C., 2.16 Kg).

Procedure for Preparation of the Spherical Adduct A

An initial amount of microspheroidal $MgCl_2.2.8C_2H_5OH$ was prepared according to the method described in Example 2 of WO98/44009, but operating on larger scale. The support adduct had a P50 of about 25 micron, and an ethanol content of about 56% wt. This adduct is called adduct A.

Procedure for Preparation of the Spherical Adduct B

The above mentioned spherical adduct A was exposed to a thermal dealcoholation at temperatures between 40 and 130° C. After this treatment, the adduct contained 50% wt of ethanol. This adduct is called adduct B.

General Procedure for the Preparation of the Solid Catalyst Component

Into a 500 ml round bottom flask, equipped with mechanical stirrer, cooler and thermometer 250 ml of $TiCl_4$ were introduced at room temperature under nitrogen atmosphere. After cooling to 0° C., while stirring, the internal donor and 10.0 g of the spherical adduct (prepared as described above) were sequentially added into the flask. The amount of charged internal donor was such to charge a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh TiCl$_4$ was added to reach the initial liquid volume again. The mixture was then heated at 120° C. and kept at this temperature for 1 hour. Stirring was stopped again, the solid was allowed to settle and the supernatant liquid was siphoned off.

The solid was washed with anhydrous hexane six times (6×100 ml) in temperature gradient down to 60° C. and one time (100 ml) at room temperature. The obtained solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, were charged in sequence with 75 ml of anhydrous hexane, 0.76 g of AlEt$_3$, 0.076 g of dicyclopentyldimethoxysilane (D donor) and 0.006÷0.010 g of solid catalyst component. The autoclave was closed; subsequently 2.0 Nl of hydrogen were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Examples 1-5, and Comparative Examples 1-2

Various donors were used in the preparation of the solid catalyst component, following the description given above. The donors used are listed in Table 1.

The thus obtained solid catalyst components were analyzed for their composition, and were tested in polymerization of propylene, using the method described above. The titanium and internal donor content of the solid catalyst components, and their performance in polymerization are also shown in Table 1.

Example 6

The preparation of the solid catalytic component of Example 3 was repeated, with different conditions in the first titanation step. The donor was charged during the thermal ramp at 40° C., instead of 0° C. as in Example 3. The first titanation was done at 120° C. instead of 100° C. of Example 3.

The thus obtained solid catalyst component was analyzed for its composition, and was tested in polymerization of propylene, using the method described above. The titanium and internal donor content of the solid catalyst component, and its performance in polymerization are also shown in Table 1.

Example 7

The preparation of the solid catalytic component of Example 3 was repeated, now using Adduct B as magnesium precursor.

The thus obtained solid catalyst component was analyzed for its composition, and was tested in polymerization of propylene, using the method described above. The titanium and internal donor content of the solid catalyst component, and its performance in polymerization are also shown in Table 1.

Example 8

The solid catalyst component of Example 3 was used in the polymerization of propylene without external donor. The rest of the polymerization procedure was the same as in the procedure described above. The results of the polymerization are given in Table 1.

Example 9

The solid catalyst component of Example 4 was used in the polymerization of propylene without external donor. The rest of the polymerization procedure was the same as in the procedure described above. The results of the polymerization are given in Table 1.

TABLE 1

Composition and performance of exemplified catalysts

| Ex. | Internal Donor Name | % wt | Ti % wt | Mileage kg/g | XI % wt | MIL g/10' |
|---|---|---|---|---|---|---|
| 1 | 2-(1-ethoxy-4-methyl-1-oxopentan-2-yl)phenyl benzoate | 11.8 | 4.3 | 62 | 96.6 | 4.2 |
| 2 | 4-(tert-butyl)-2-(1-ethoxy-4-methyl-1-oxopentan-2-yl)-6-methylphenyl benzoate | 16.2 | 4.3 | 66 | 98.2 | 1.9 |
| 3 | 4-(tert-butyl)-2-(2-ethoxy-2-oxoethyl)-6-methylphenyl benzoate | 21.3 | 3.2 | 76 | 97.9 | 2.8 |
| 4 | 4-(tert-butyl)-2-(2-ethoxy-2-oxoethyl)-6-methylphenyl 4-propylbenzoate | 20.1 | 3.4 | 84 | 98.4 | 1.8 |
| 5 | 2-(2-ethoxy-2-oxoethyl)-4,6-dimethylphenyl 4-propylbenzoate | 9.4 | 3.3 | 63 | 96.4 | ND |
| 6 | 4-(tert-butyl)-2-(2-ethoxy-2-oxoethyl)-6-methylphenyl benzoate | 10.0 | 3.4 | 66 | 97.2 | 1.1 |
| 7 | 4-(tert-butyl)-2-(2-ethoxy-2-oxoethyl)-6-methylphenyl benzoate | 12.1 | 3.4 | 50 | 97.9 | 3.5 |
| 8 | 4-(tert-butyl)-2-(2-ethoxy-2-oxoethyl)-6-methylphenyl benzoate | 21.3 | 3.2 | 128 | 93.2 | 6.3 |
| 9 | 4-(tert-butyl)-2-(2-ethoxy-2-oxoethyl)-6-methylphenyl 4-propylbenzoate | 20.1 | 3.4 | 134 | 93.6 | ND |
| C1 | 4-ethoxy-4-oxobutan-2-yl benzoate | ND | 3.9 | 30 | 96.4 | 5.3 |
| C2 | ethyl 2-(benzoyloxy)-5-methylbenzoate | N.D | 4.7 | 47.5 | 94.5 | 4.5 |

N.D. no data

The invention claimed is:

1. A catalyst component for the polymerization of olefins comprising Mg, Ti and an electron donor compound of the following formula (I):

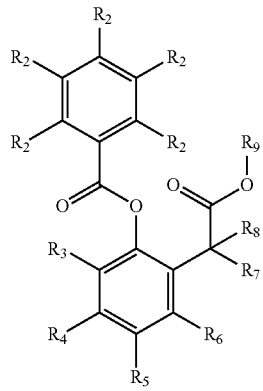

in which $R_2$-$R_8$ groups, equal or different to each other, are selected from hydrogen, halogen and $C_1$-$C_{15}$ hydrocarbon groups which can be linked together to form one or more saturated or unsaturated cycles and can optionally contain an heteroatom selected from halogen, O, P, S, N, and Si and the $R_9$ group is selected from $C_1$-$C_{15}$ hydrocarbon groups optionally containing an heteroatom selected from halogen, O, P, S, N, and Si.

2. The catalyst component according to claim 1 in which the $R_9$ group is selected from $C_1$-$C_{10}$ hydrocarbon groups.

3. The catalyst component according to claim 2 in which the $R_9$ group is selected from $C_1$-$C_{10}$ alkyl groups.

4. The catalyst component according to claim 1 in which at least one of $R_2$ is different from hydrogen and selected from $C_1$-$C_{15}$ hydrocarbon groups or halogen.

5. The catalyst component according to claim 4 in which only one of $R_2$ groups is different from hydrogen and selected from $C_1$-$C_{10}$ alkyl groups, $C_6$-$C_{14}$ aryl groups, $C_3$-$C_{15}$ cycloalkyl groups, and $C_7$-$C_{15}$ arylalkyl or alkylaryl groups.

6. The catalyst component according to claim 5 in which the $R_2$ substituent different from hydrogen is located in 4-position.

7. The catalyst component according to claim 1 in which at least one of the $R_3$-$R_6$ groups is different from hydrogen.

8. The catalyst component according to claim 7 in which at least one of said $R_3$-$R_6$ groups is selected from $C_1$-$C_5$ alkyl groups.

9. The catalyst component according to claim 8 in which at least two of $R_3$-$R_6$ groups are selected from $C_1$-$C_5$ alkyl groups.

10. The catalyst component according to claim 9 in which $R_3$ and $R_5$ groups are different from hydrogen and selected from $C_1$-$C_5$ alkyl groups.

11. The catalyst component according to claim 10 in which $R_3$ is a linear $C_1$-$C_5$ alkyl group, and $R_5$ is a branched alkyl group.

12. The catalyst component according to claim 1 in which $R_7$ and $R_8$ are independently selected from hydrogen and $C_1$-$C_{10}$ hydrocarbon groups.

13. The catalyst component according to claim 1 in which one of $R_7$ and $R_8$ is hydrogen and the other is selected from $C_1$-$C_8$ linear or branched alkyl groups.

14. A catalyst for the (co)polymerization of olefins $CH_2$=CHR, in which R is hydrogen or a hydrocarbyl radical with 1-12 carbon atoms, comprising a product obtained by contacting the solid catalyst component according to claim 1, and an alkylaluminum compound and, optionally, an external donor compound.

15. A process for the polymerization of at least one olefin carried out in the presence of a catalyst according to claim 14.

16. The process of claim 15, wherein the at least one olefin comprises propylene.

17. A composition comprising a polyolefin and the catalyst component of claim 1.

18. The composition of claim 17, wherein the polyolefin comprises polypropylene.

19. The composition of claim 17, further comprising a catalyst for the (co)polymerization of olefins $CH_2$=CHR, in which R is hydrogen or a hydrocarbyl radical with 1-12 carbon atoms, comprising a product obtained by contacting: the solid catalyst component, and an alkylaluminum compound and, optionally, an external donor compound.

20. The composition of claim 19, wherein the polyolefin comprises polypropylene.

* * * * *